United States Patent
Aso et al.

(10) Patent No.: US 7,668,154 B2
(45) Date of Patent: Feb. 23, 2010

(54) INFORMATION PROCESSING APPARATUS, COMMUNICATION CONTROL METHOD, AND COMMUNICATION CONTROL PROGRAM

(75) Inventors: Junichi Aso, Kanagawa (JP); Masahiko Hatori, Kanagawa (JP); Rao S. Sudham, Kanagawa (JP); Vijay Alone, Kanagawa (JP)

(73) Assignee: Lenovo (Singapore) Pte. Ltd, Singapore (SG)

( * ) Notice: Subject to any disclaimer, the term of this patent is extended or adjusted under 35 U.S.C. 154(b) by 644 days.

(21) Appl. No.: 11/187,186

(22) Filed: Jul. 21, 2005

(65) Prior Publication Data

US 2006/0023693 A1 Feb. 2, 2006

Related U.S. Application Data

(63) Continuation of application No. PCT/JP2004/000443, filed on Jan. 20, 2004.

(30) Foreign Application Priority Data

Jan. 21, 2003 (JP) .............................. 2003-012875

(51) Int. Cl.
H04L 12/28 (2006.01)
(52) U.S. Cl. ........................ 370/351; 370/338; 370/329; 709/220
(58) Field of Classification Search ................ 370/338, 370/329, 350, 351; 709/220
See application file for complete search history.

(56) References Cited

U.S. PATENT DOCUMENTS

| 5,696,891 | A  | * | 12/1997 | Ide .............................. 358/1.13 |
| 6,888,811 | B2 | * | 5/2005  | Eaton et al. .................. 370/338 |
| 7,313,111 | B2 | * | 12/2007 | Hietalahti et al. ........... 370/329 |
| 2004/0003060 | A1 | * | 1/2004 | Asoh et al. ................... 709/220 |

* cited by examiner

Primary Examiner—Dang T Ton
Assistant Examiner—Pamit Kaur
(74) Attorney, Agent, or Firm—Nutter McClennen & Fish LLP; John J. Penny, Jr.

(57) ABSTRACT

The information processing apparatus comprises a network setting information storage portion for storing network setting information corresponding to each of a plurality of locations; a communication interface setting information storage potion for storing communication interface setting information corresponding to each of plural pieces of network setting information; a network setting portion for selecting one piece of network setting information corresponding to the location of the information processing apparatus; a communication interface setting information setting portion for selecting one piece of communication interface setting information from plural pieces of communication interface setting information associated with one piece of network setting information; and a communication portion for performing communication based on setting according to the one piece of network setting information and the one piece of communication interface setting information.

12 Claims, 10 Drawing Sheets

[Figure 1]
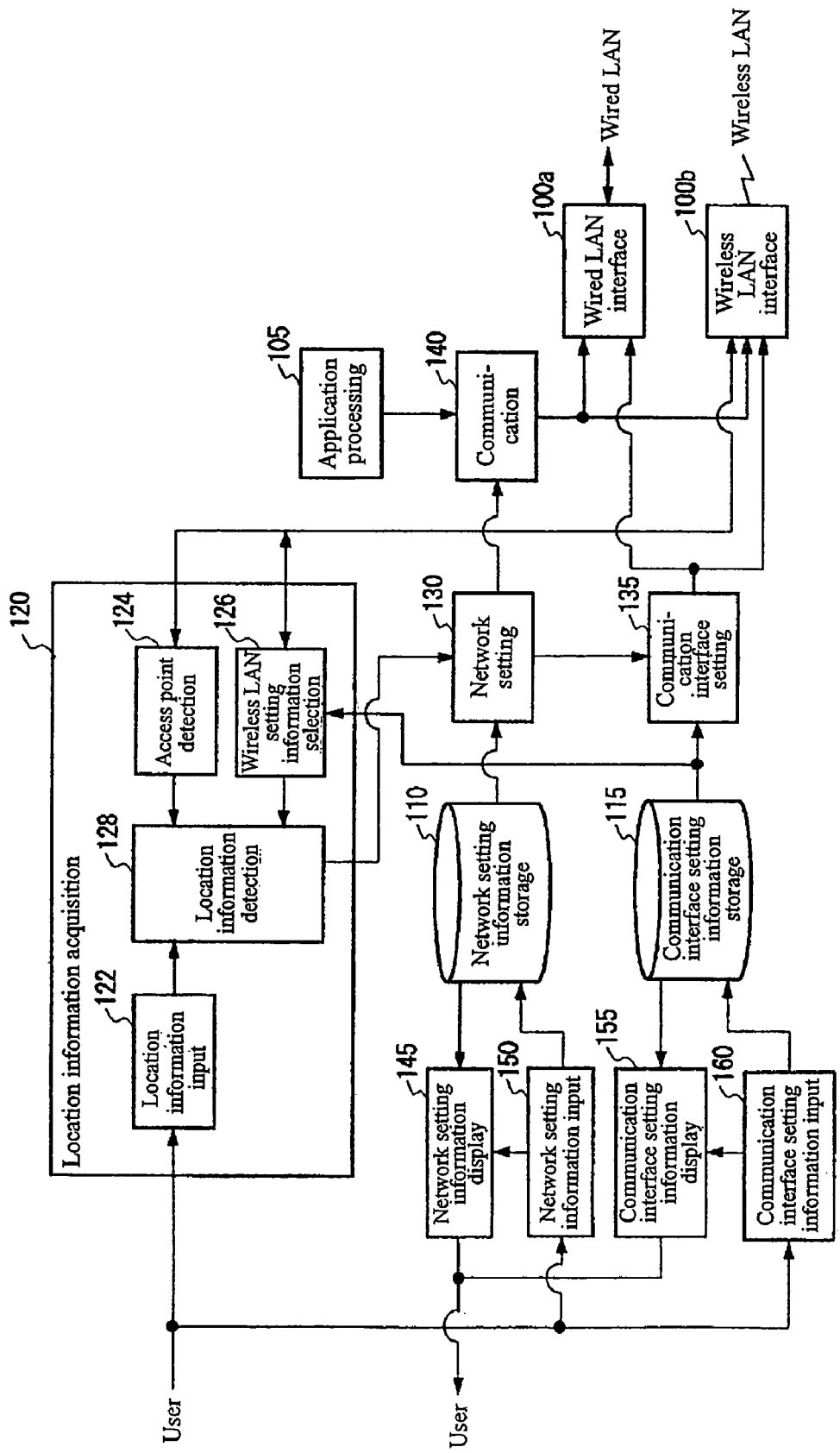

[Figure 2]

| Location | Network setting information | | |
|---|---|---|---|
| | TCP/IP settings | Internet settings | Printer settings |
| Office | IP address =192.168.1.125<br>Subnet mask =255.255.255.0<br>Default gateway =192.168.1.254<br>DNS server =000.000.000.000 | Proxy server =000.000.000.000<br>Application setting = · · · · ·<br>VPN setting = · · · · · | Printer 1 = · · · · ·<br>Printer 2 = · · · · · |
| Home | IP address =192.168.1.1<br>Subnet mask =255.255.255.0<br>Default gateway =000.000.000.000<br>DNS server =000.000.000.000 | Proxy server =000.000.000.000<br>Application setting = · · · · ·<br>VPN setting = · · · · · | Printer 1 = · · · · ·<br>Printer 2 = · · · · · |

[Figure 3]

| Location | Communication interface | Communication interface settings | Speed | Priority |
|---|---|---|---|---|
| Office | Wired LAN interface | — | 100Mbps | 1 |
| Office | Wireless LAN interface | SSID=OFFICE102<br>WEP key=＊＊＊・・・ | 11Mbps | 1 |
| Home | Wired LAN interface | — | 10Mbps | 1 |
| Home | Wireless LAN interface | SSID=myHOME<br>WEP key=＊＊＊・・・ | 11Mbps | 2 |

115

[Figure 4]
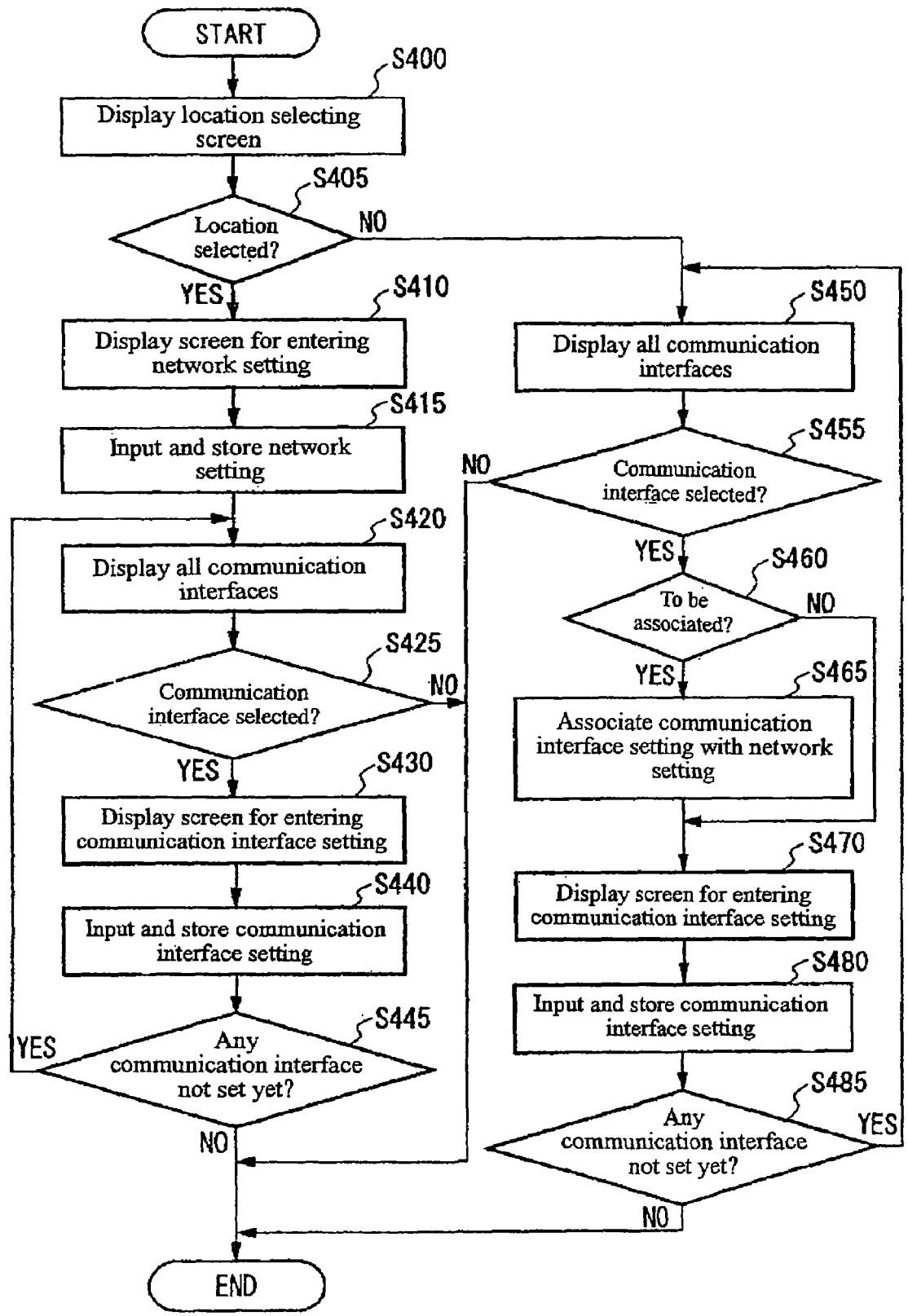

[Figure 5]
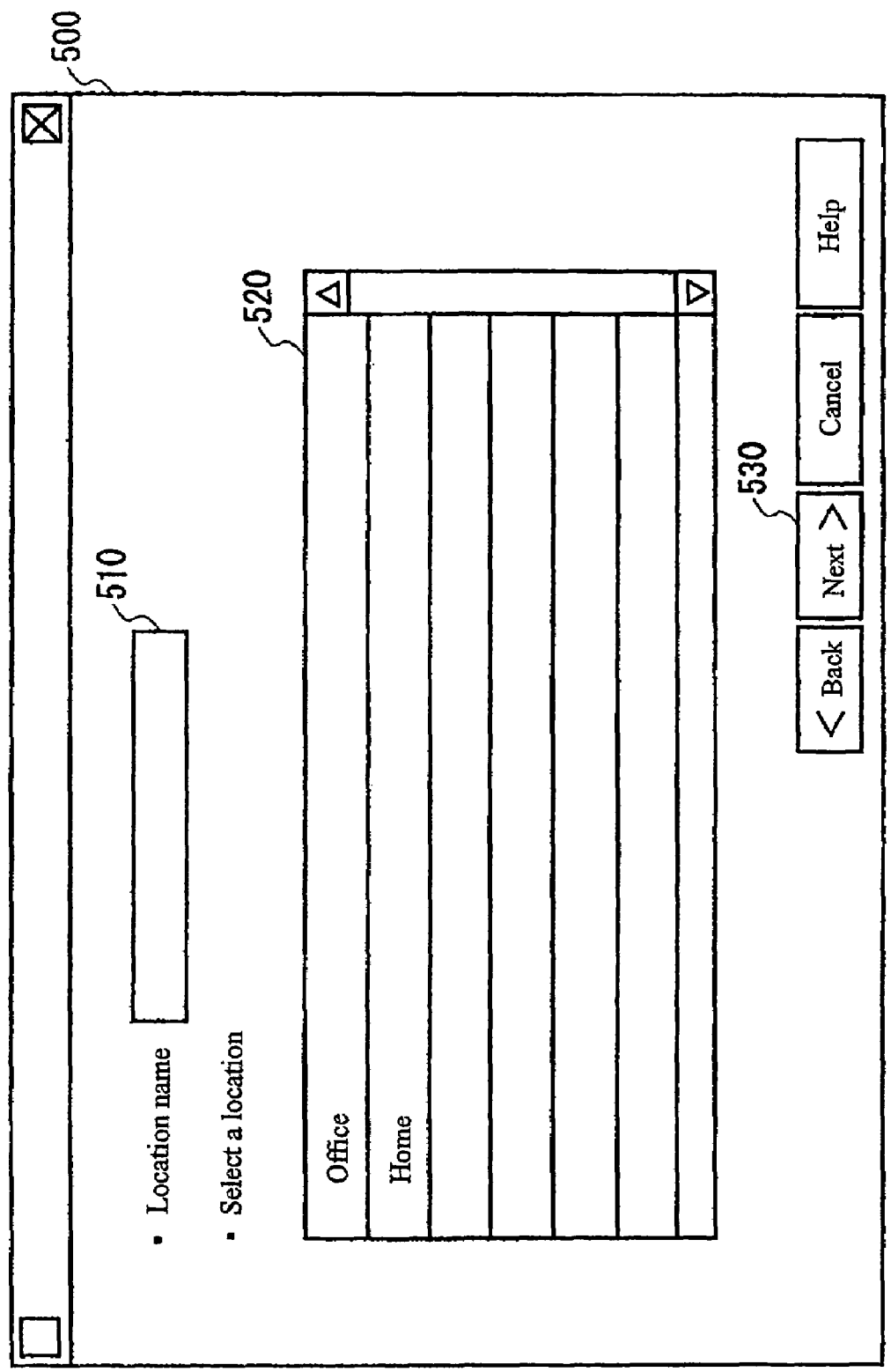

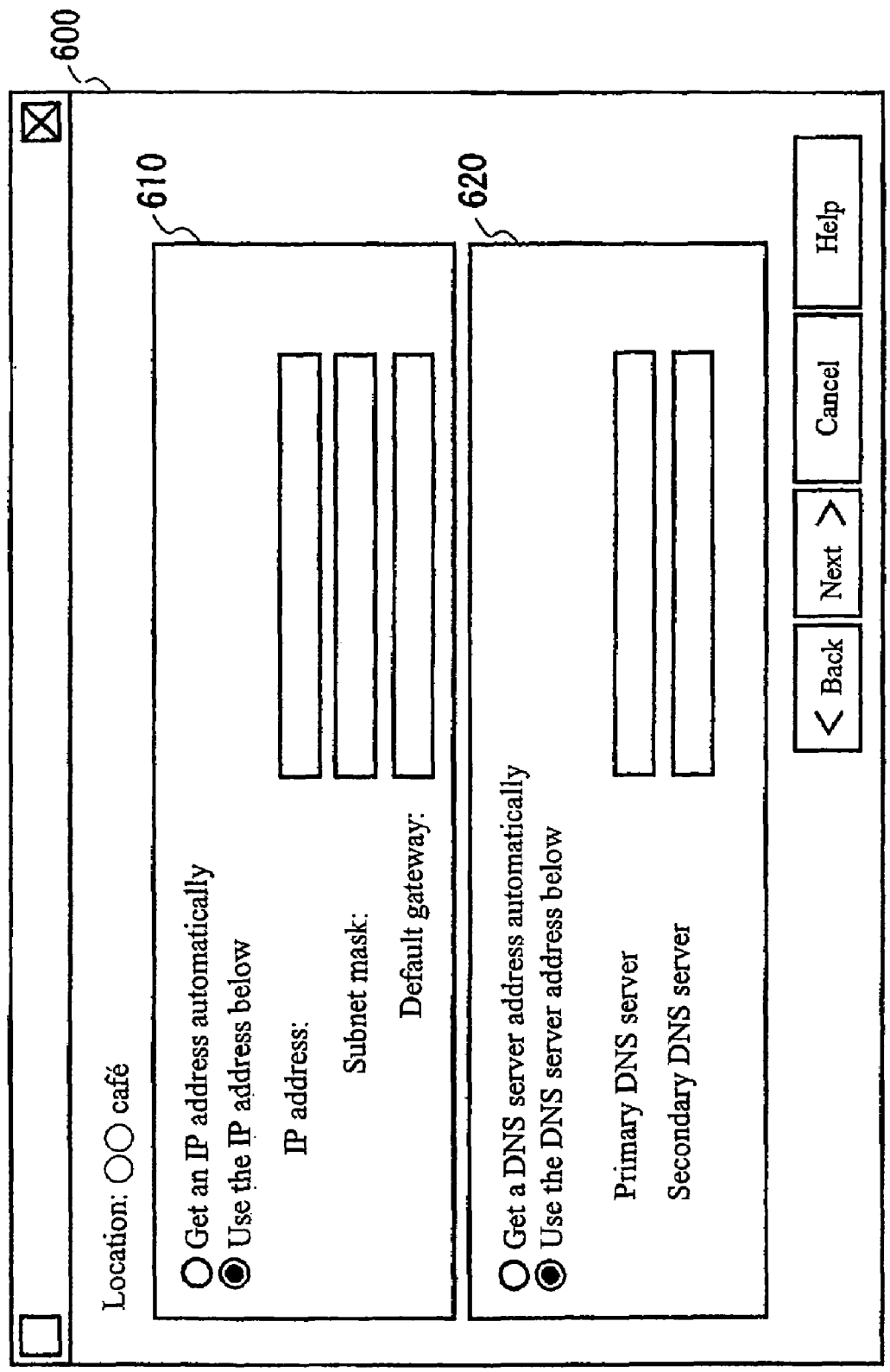
[Figure 6]

[Figure 7]
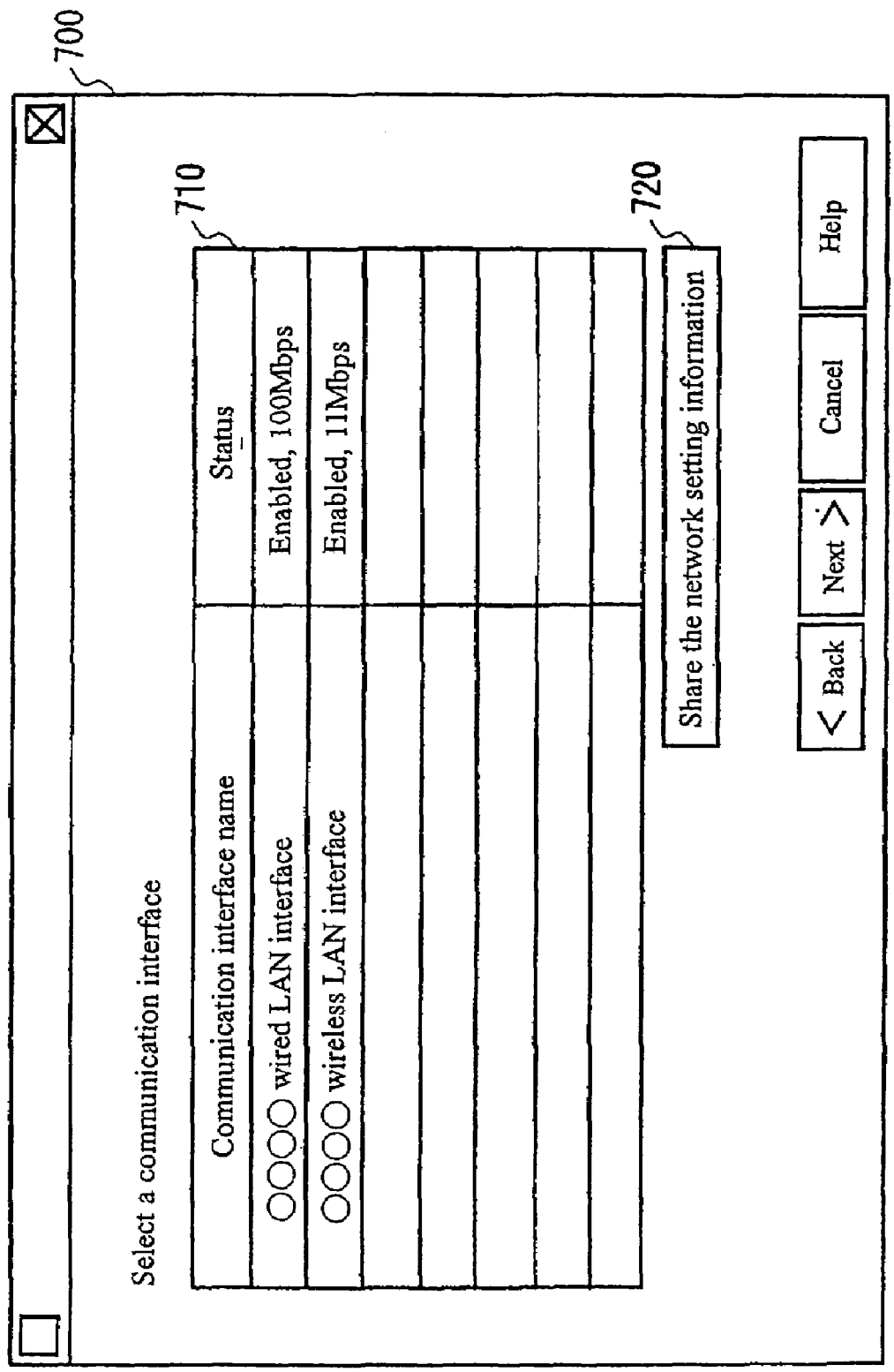

[Figure 8]
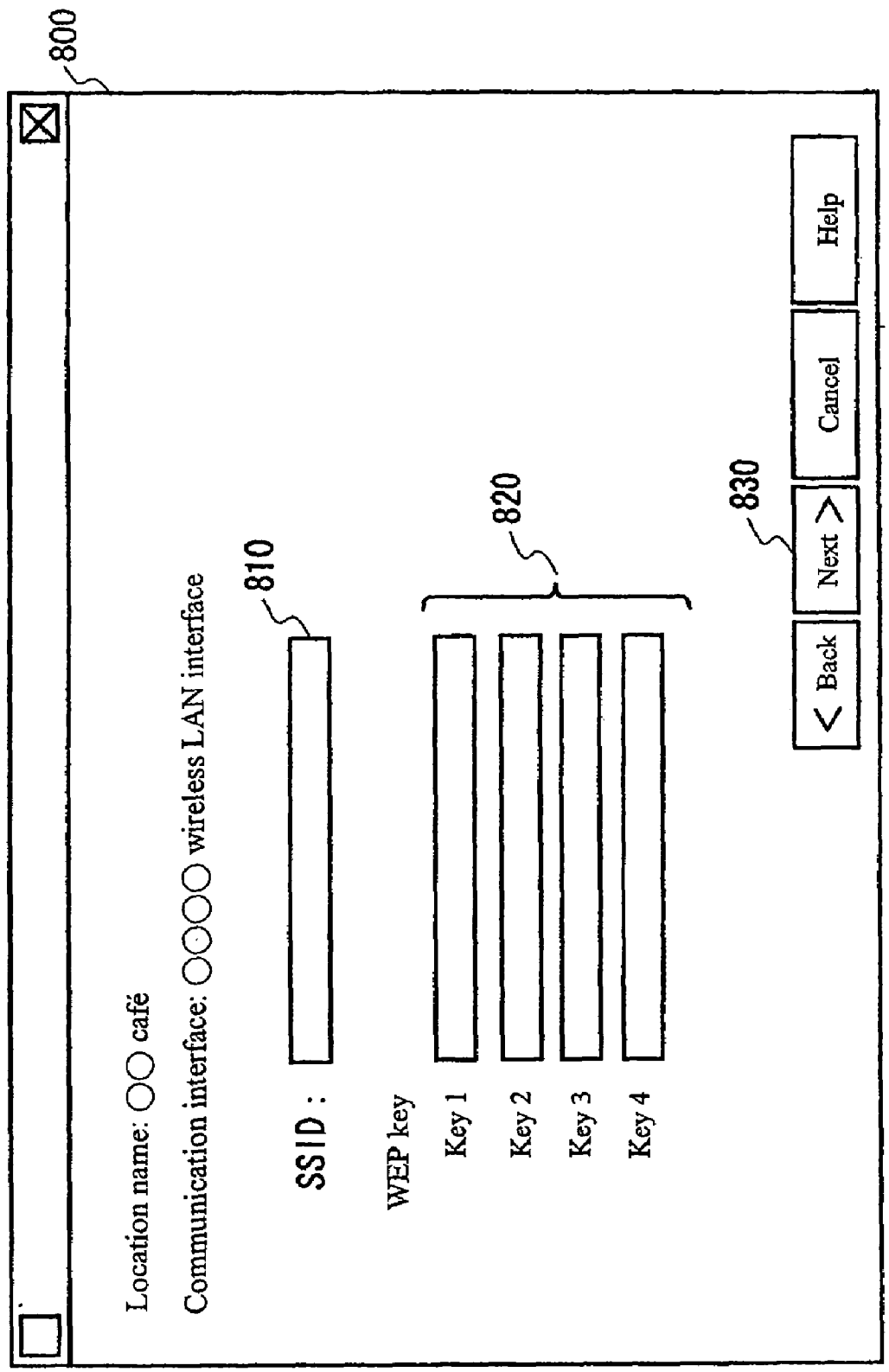

[Figure 9]
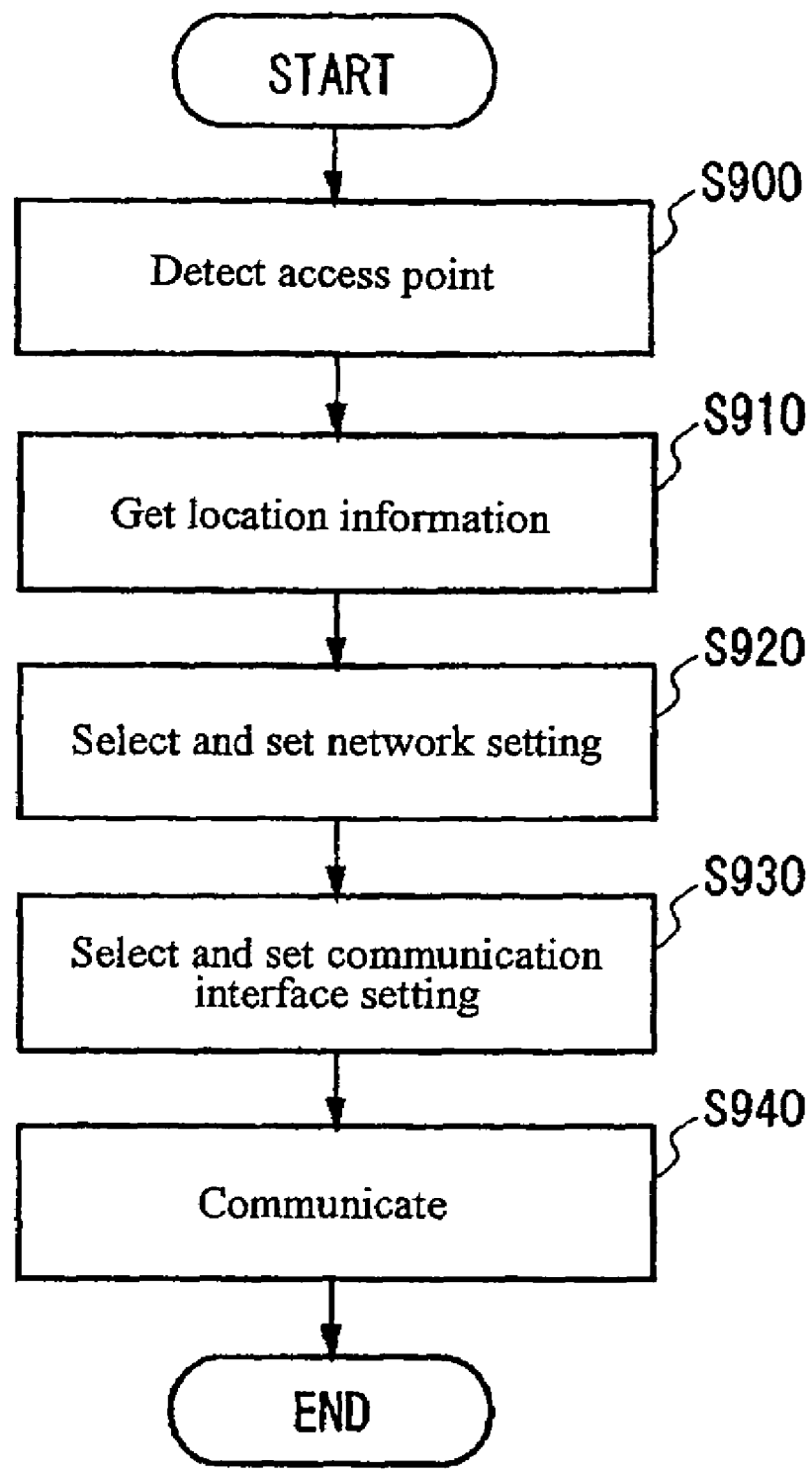

[Figure 10]
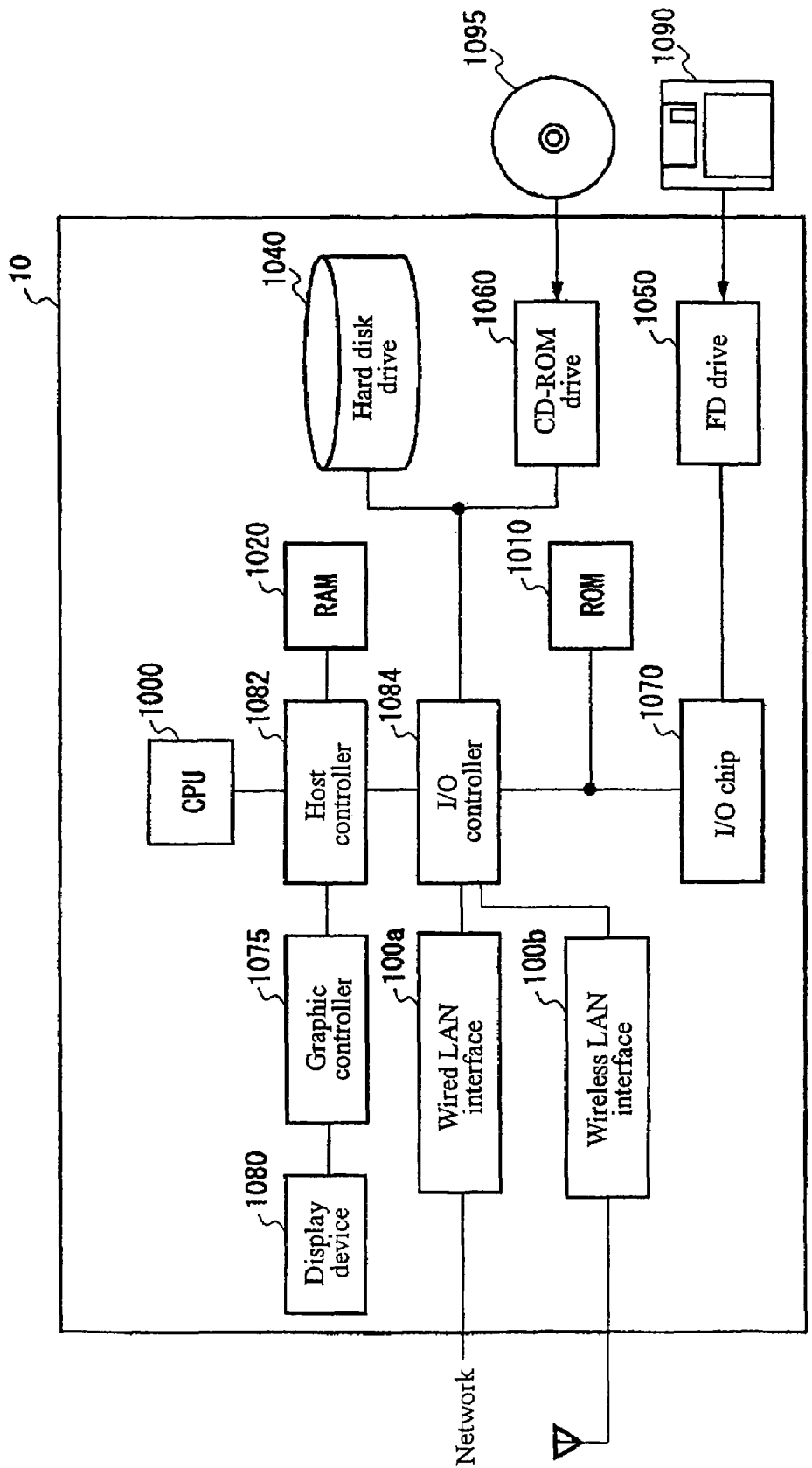

US 7,668,154 B2

INFORMATION PROCESSING APPARATUS, COMMUNICATION CONTROL METHOD, AND COMMUNICATION CONTROL PROGRAM

CROSS REFERENCE TO THE PRESENT APPLICATION

The present application is a continuation application of PCT/JP2004/000443 filed on Jan. 20, 2004 which claims priority from a Japanese Patent Application No. 2003-012875 filed on Jan. 21, 2003, the contents of which are incorporated herein by reference for all purpose.

BACKGROUND OF THE INVENTION

1. Field of the Invention

The present invention relates to an information processing apparatus, communication control method, and communication control program. More particularly, the invention relates to an information processing apparatus, communication control method, and communication control program that allow a plurality of communication interfaces to be easily set and selectively used when communication is performed at multiple locations.

2. Related Art

In general, when communication is performed at each of multiple locations employing an information processing apparatus having a plurality of communication interfaces, network setting for each location and setting specific to a communication interface are performed for each of the communication interfaces as disclosed, for example, in a Japanese Patent Application Publication No. 2002-252620 (in particular pages 7 and FIGS. 5 to 7 thereof.

However, if a plurality of communication interfaces are independently set for each location, a lot of items have to be set, which can lead to mistakes. Also, when change is made to network setting for a location, network setting for all communication interfaces corresponding to the location also need to be changed, which requires cumbersome operations.

SUMMARY OF THE INVENTION

The invention therefore has an object of providing an information processing apparatus, communication control method, and communication control program that can solve the problem mentioned above. The object is attained by combinations of features set forth in independent claims of the claims. Dependent claims define further advantageous and specific examples of the invention.

That is, according to a first embodiment of the invention an information processing apparatus is provided that comprises a network setting information storage portion for storing, for each of a plurality of locations, network setting information to be set in the information processing apparatus so as to perform communication via a network at a location; a communication interface setting information storage portion for storing, for each of plural pieces of network setting information communication interface setting information to be set for each of the plurality of communication interfaces for performing communication using the network setting information; a location information acquisition portion for obtaining location information indicating the location of the information processing apparatus; a network setting portion for, based on the location information, selecting one piece of the network setting information that corresponds to the location of the information processing apparatus from the plural pieces of network setting information each corresponding to each of the plurality of locations, and setting the information in the information processing apparatus; a communication interface setting portion for selecting one piece of communication interface setting information from a plural pieces of communication interface setting information that are associated with the piece of network setting information, and setting the information for one of the communication interfaces that corresponds to the piece of communication interface setting information; and a communication portion for performing communication by way of the communication interface based on the setting in accordance with the piece of network setting information and the piece of communication interface setting information. Also, a communication control method and a communication control program for the information processing apparatus are provided.

According to a second embodiment of the invention, an information processing apparatus is provided that comprises a network setting information input portion for prompting a user of the information processing apparatus to enter, for each of a plurality of locations, network setting information that should be set in the information processing apparatus so as to perform communication via a network at a location; a communication interface setting information input portion for prompting the user of the information processing apparatus to sequentially enter, for each of plural pieces of network setting information, communication interface setting information that should be set for each of the plurality of communication interfaces; a location information acquisition portion for obtaining location information indicating the location of the information processing apparatus; and a communication portion for performing communication based on setting according to the network setting information corresponding to the location specified by the location information and the communication interface setting information selected from the plural pieces of communication interface setting information associated with the network setting information. Also, a communication control method and a communication control program for the information processing apparatus are provided.

The summary of the invention above does not list all of the required features of the invention, and sub-combinations of those features can also be the invention.

BRIEF DESCRIPTION OF THE DRAWINGS

FIG. 1 shows the functional configuration of an information processing apparatus 10 of an embodiment of the invention;

FIG. 2 is a table illustrating information stored in a network setting information storage portion 110 of the embodiment;

FIG. 3 is a table illustrating information stored in a communication interface setting information storage portion 115 of the embodiment;

FIG. 4 shows a flow of setting the information processing apparatus 10 of the embodiment;

FIG. 5 shows a location selection screen 500 that is displayed in the setting flow in the embodiment;

FIG. 6 shows a network setting information entry screen 600 that is displayed in the setting flow in the embodiment;

FIG. 7 shows a communication interface setting information entry screen 700 that is displayed in the setting flow in the embodiment;

FIG. 8 shows a communication interface setting information entry screen 800 that is displayed in the setting flow in the embodiment;

FIG. 9 shows a flow of communication by the information processing apparatus 10 of the embodiment; and FIG. 10 shows the hardware configuration of the information processing apparatus 10 of the embodiment.

DETAILED DESCRIPTION OF THE INVENTION

The invention will be described with reference to its embodiment, although the embodiment does not limit the invention according to the claims and not all of the combinations of features described in the embodiment are required for the solution of the invention.

FIG. 1 shows the functional configuration of an information processing apparatus 10 of an embodiment. The information processing apparatus 10 of the embodiment comprises a plurality of communication interfaces and performs communication using network setting common to those communication interfaces and communication interface setting specific to each of the communication interfaces. This eliminates the necessity for a user of the information processing apparatus 10 to make network setting for each of the communication interfaces for each location, thus the user can set the plurality of communication interfaces with ease.

The information processing apparatus 10 comprises communication interfaces 100a and 100b, an application processing portion 105, network setting information storage portion 110, communication interface configuration information storage portion 115, location information acquisition portion 120, network setting portion 130, communication interface setting portion 135, communication portion 140, network setting information display portion 145, network setting information input portion 150, communication interface setting information display portion 155, and communication interface setting information input portion 160.

The communication interfaces 100a and 100b are communication adapters that connect the information processing apparatus 10 to a network enabling it to communicate. In this embodiment, for the purpose of illustration, the communication interface 100a is a wired LAN interface such as Ethernet□ and the communication interface 100b is a wireless LAN interface such as IEEE 802.11b, for example. Alternatively, the communication interfaces 100a and 100b may be other communication interfaces such as wireless communication interface using a mobile telephone network and the like and short-distance wireless communication interfaces such as Bluetooth (a registered trademark) and infrared communication.

The application processing portion 105 processes applications running on the information processing apparatus 10 and causes the communication portion 140 to perform communication required by the applications. The network setting information storage portion 110 stores network setting information that should be set for the communication portion 140 within the information processing apparatus 10 for performing communication via a network at each of a plurality of locations at which the information processing apparatus 10 is used. The communication interface setting information storage portion 115 stores communication interface setting information specific the communication interface 100 that should be set for each of the communication interface 100a and b so that communication is performed through the communication interfaces 100a and 100b using each network setting information. The information corresponds to each of the plurality of network settings stored in the network setting information storage portion 110.

The location information acquisition portion 120 obtains location information indicating where the information processing apparatus 10 is located. The location information acquisition portion 120 has a location information input portion 122, access point detection portion 124, wireless LAN setting information selecting portion 126, and location information detection portion 128. The location information input portion 122 obtains location information for the information processing apparatus 10 by having the user of the apparatus 10 specify the location of the information processing apparatus 10. The access point detection portion 124 detects a SSID (Service Set ID) that identifies network connection using an access point and that is set for an access point to a wireless LAN and the like situated in the proximity of the information processing apparatus 10. The wireless LAN setting information selection portion 126 sequentially sets wireless LAN interface settings information, which is communication interface settings to be set for the communication interface 100b and stored in the communication interface setting information storage portion 115 for each of the plurality of network settings, for the communication interface 100b and detects whether communication with the access point is possible or not. The location information detection portion 128 detects the location of the information processing apparatus 10 as location information based on processing result of the location information input portion 122, access point detection portion 124, and wireless LAN setting information selection portion 126.

The location information is used for determining communication setting to be set for the information processing apparatus 10 depending on the location at which the apparatus 10 is used, and may not be information indicating a particular location. That is, for example, the location information may be information that indicates a specific locations such as "office room" and "home", or may be information corresponding to a given location within a specified area such as "within the city of Tokyo", "away from home/office", and "other locations".

Based on the location information obtained by the location information acquisition portion 120, the network setting portion 130 selects network setting information corresponding to the location of the information processing apparatus 10 from the plurality of network settings corresponding to multiple locations, and sets it for the communication portion 140 in the information processing apparatus 10. The communication interface setting portion 135 selects communication interface setting information for use in communication from a plurality of communication interface settings in the communication interface setting information storage portion 115 that are associated with network setting information set in the network setting portion 130, and sets it for a corresponding communication interface. Using the communication interface 100 that corresponds to the communication interface setting information set in the communication interface setting portion 135 and in accordance with the network setting set by the network setting portion 130 and the communication interface setting, the communication portion 140 performs communication as requested by the application processing portion 105.

The network setting information display portion 145 displays network setting information to the user of the information processing apparatus 10. The network setting information input portion 150 prompts the user of the information processing apparatus 10 to input network setting information and stores it in the network setting information storage portion 110. The communication interface setting information display portion 155 displays communication interface setting information to the user of the information processing apparatus 10. The communication interface setting information input portion 160 prompts the user of the information processing apparatus 10 to enter communication interface setting information and stores it in the communication interface setting information storage portion 115.

FIG. 2 is a table showing information stored in the network setting information storage portion 110 in the embodiment. The network setting information storage portion 110 stores network setting information corresponding to each of a plurality of locations that should be set in the communication portion 140 for performing communication via a network at a location. The network setting information is information that should be set in common whether either of the communication interfaces 100a or 100b is used for communication, being independent of the type of the communication interface 100.

The network setting information of the embodiment includes fields for TCP/IP setting information, the Internet setting information, and printer setting information. The TCP/IP setting information field stores setting information that specifies an IP address and a subnet mask to be assigned to the information processing apparatus 10 and a gateway and a DNS server on a network for given location. The Internet setting information field stores setting information specifying a proxy server to be set for using a network at a location, setting information for an application used for communication at the location, and information on VPN settings. The printer setting information field stores setting information specifying a printer on a network for the location.

FIG. 3 is a table illustrating information stored in the communication interface setting information storage portion 115 in the embodiment. The communication interface information storage portion 115 stores, for each of the plurality of locations, a set of a communication interface to be used at a location, communication interface setting information to be used at the location, a communication speed at the location, and priority of the communication interface to be used at the location. Since each of the locations corresponds to each network setting, the plurality of communication interface settings and the like are stored as associated with each of the plurality of network settings.

The communication interface setting information field stores communication interface setting information that is set for each of the communication interfaces 100a and 100b and is dependent on the type of the communication interface 100. The communication interface setting information storage portion 115 stores, for each location, wireless LAN interface setting information, which is communication interface setting information for the communication interface 100b including SSIDs set for access points for multiple locations. The wireless LAN interface setting information may further include settings such as a WEP key that the communication interface 100b uses for communication over a wireless LAN. The communication interface setting information may include setting information that depends on the type of the communication interface 100 such as settings of device drivers for the communication interface 100.

The communication speed field stores communication speeds of the communication interface 100 at locations corresponding to the entries of the communication interface setting information storage portion 115. The communication speeds of the communication interface 100 may be determined based on the type of the communication interface 100, or alternatively, may be ones that are actually measured. The priority field stores the priorities for selecting locations corresponding to the entries of the communication interface setting information storage portion 115 and the communication interface 100.

FIG. 4 is a flow of setting the information processing apparatus 10 of the embodiment. FIGS. 5, 6, 7 and 8 show a location selection screen 500 that is displayed in the flow of the embodiment, a screen for entering network setting information 600, a screen for entering communication interface setting information 700, and a screen for entering communication interface setting information 800, respectively. The following will describe the flow of setting the information processing apparatus 10 with reference to FIGS. 5 through 8.

S400, S405, S410, S415, S420, S425, S430, S440 and S445 in the flow are processing of prompting the user to enter network setting information corresponding to a specified location as well as a plurality of communication interface settings corresponding to the network setting information.

First, the network setting information display portion 145 displays the screen for selecting a location 500 shown in FIG. 5 to the user of the information processing apparatus 10 (step S400). The screen 500 includes a location entry box 510 for the user to input the name of a new location, a location selection box 520 for the user to specify a location to be set from a plurality of locations stored in the network setting information storage portion 110, and a "Next" button 530 for the user to enter a direction to proceed to the next screen.

If the "Next" button 530 is actuated after the name of a new location is entered in the location entry box 510 or a location is selected in the location selection box 520 (S405: Yes), the network setting information input portion 150 advances processing to S410. However, if the "Next" button 530 is actuated when the name of a new location is not entered nor a location is specified in the location selection box 520 (S405: No), the network setting information input portion 150 advances processing to S450.

At S410, the network setting information display portion 145 displays the screen for entering network setting information 600 shown in FIG. 6 to the user of the information processing apparatus 10 (S410). The screen 600 comprises an IP address setting box 610 for displaying and configuring setting information about an IP address, a subnet mask, and a default gateway among network settings corresponding to the location specified at S400 and S405, and a DNS serer setting box 620 for displaying and configuring information on DNS server settings.

If a location to be set has been specified from a plurality of locations at S405, the network setting information display portion 145 displays network setting information corresponding to the location in the IP address setting box 610 and the DNS server setting box 620. On the other hand, if the name of a new location has been entered at S405, the network setting information display portion 145 displays the IP address setting box 610 and the DNS server setting box 620 as empty boxes.

Then, the network setting information input portion 150 prompts the user of the information processing apparatus 10 to enter network setting information corresponding to the specified location via the IP address setting box 610 and the DNS server setting box 620, and stores the network setting information, if entered, in the network setting information storage portion 110 (S415).

Next, the communication interface setting information display portion 155 displays the screen for entering communication interface setting information 700 shown in FIG. 7 to the user of the information processing apparatus 10 (S420). The screen 700 comprises a communication interface selection box 710 for displaying the communication interfaces 100a and 100b provided by the information processing apparatus 10 for the user to select either communication interface 100, and a network setting information sharing button 720 for allowing the user to direct the processing at S470.

If either the communication interface is selected from the communication interface selection box 710 (S425: Yes), the communication interface setting information display portion 155 displays the screen for entering communication interface setting information 800 shown in FIG. 8 (S430). The communication interface setting information input portion 160 then prompts the user to enter communication interface setting information corresponding to the network setting information and stores it in the communication interface setting information storage portion 115 (S440). Here, the communication interface setting information input portion 160 causes the user to enter a SSID to the SSID entry box 810 and a WEP key to the WEP key entry box 820 as wireless LAN interface setting information for the communication interface 10*b*.

The communication interface setting information display portion 155 and communication interface setting information input portion 160 repeat S420, S425, S430 and S440 described above for each communication interface 100 that has not been set yet for the location (S445), thereby allowing the user of the apparatus 10 to sequentially enter a plurality of communication settings corresponding to the network setting and storing the information in the communication interface setting information storage portion 115.

If a communication interface is not selected in the communication interface selection box 710 (S425: No), the communication interface setting information input portion 160 terminates the setting flow.

The information processing apparatus 10 can allow the user to sequentially enter network settings corresponding to each of the plurality of locations and communication interface settings corresponding to each of the plurality of network settings, byexecutingS400, S405, S410, S415, S420, S425, S430, S440 and S445 for each of the plurality of locations.

If the user of the apparatus 10 specifies change to network setting information at S415, the network setting information input portion 150 modifies the network setting information stored in the network setting information storage portion 110 as associated with the location. The communication portion 140 then performs communication in accordance with the modified network setting and selected communication interface setting when performing communication using all communication interface settings selected from the plurality of communication interface settings that are associated with the modified network setting information. As a result, if the user of the information processing apparatus 10 changes stored network setting corresponding to a particular location, he/she can utilize communication based on the changed network setting information when performing communication using a given network interface setting associated with the network setting.

S400, S405, S450, S455, S460, S465, S470, S480 and S485 in the setting flow are processing of allowing the user to enter communication interface setting information and associate the information with network setting selected by the user.

At S450, the communication interface setting information display portion 155 displays the screen for entering communication interface setting information 700 shown in FIG. 7 (S450). If either the communication interface 100 is selected in the communication interface selection box 710 (S455: Yes) and sharing of network setting information is specified via the network setting sharing button 720 (S460: Yes), communication interface setting information corresponding to the target communication interface 100 selected at S455 is associated with other network setting information specified by the user (S465).

More specifically, the communication interface setting information input portion 160 displays a screen for specifying a distinct communication interface 100 at the communication interface setting information display portion 155, for example, in setting the communication interface 100. The communication interface setting information input portion 160 then prompts the user to specify the distinct communication interface 100, thereby specifying communication interface setting information that is set for the specified communication interface 100 and different from the target interface. If distinct communication interface setting information is specified in such a way, the communication interface setting information input portion 160 associates the target communication interface setting with network setting corresponding to the specified distinct communication interface setting.

For example, when communication interface setting a that is associated with network setting information A is set for the communication interface 100*a*, setting of communication interface 100*b* will undergo a process as follows. In setting communication interface setting b for the communication interface 100*b*, the user specifies communication interface setting a that is different from the communication interface setting b by specifying the communication interface 100*a*. In this case, the communication interface setting information input portion 160 associates the communication interface setting information b with network setting information A corresponding to the communication interface setting information a.

With the processing at S465, the user of the information processing apparatus 10 can associate the target communication interface setting information with network setting information that corresponds to a distinct communication interface setting he/she specified.

The communication interface setting information display portion 155 and communication interface setting information input portion 160 then, in a similar way to S430 and S440, stores the target communication interface setting information in the communication interface setting information storage portion 115 (S470 and S480). The communication interface setting information display portion 155 and communication interface setting information input portion 160 can set communication interface setting corresponding to each communication interface 100 yet to be set as associated with network setting for already set communication interface setting, by repeating S450, S455, S460, S465, S470 and S480 described above for each communication interface 100 that has not been set yet (S485).

FIG. 9 shows a flow of communication by the information processing apparatus 10 of the embodiment.

First, the location information input portion 122, access point detection portion 124, and wireless LAN setting information selection portion 126 obtain or detect an access point to a wireless LAN and the like located in the vicinity of the information processing apparatus 10 (S900). That is, the location information input portion 122 has the user specify the location of the information processing apparatus 10 to obtain location information for the information processing apparatus 10. The access point detection portion 124 detects a SSID that has been set for the access point to a wireless LAN located nearby the apparatus 10 and that specifies network connection using the access point. The wireless LAN setting information selection portion 126 sets wireless LAN interface settings, which is communication interface setting information to be set for the communication interface 100*b* and is stored in the communication interface setting information storage portion 115 as associated with each of a plurality of network settings, for the communication interface 100 sequentially, and detects whether or not it is possible to communicate with the access point.

Then, the location information detection portion 128 detects the location of the information processing apparatus 10 as location information based on the processing result of the location information input portion 122, access point detection portion 124, and wireless LAN setting information selection portion 126 (S910). That is, when the location information input portion 122 has obtained location information from the user, the location information detection portion 128 uses that location information.

Also, when the access point detection portion 124 has detected a SSID set for the access point, the location information detection portion 128 detects a location that corresponds to wireless LAN interface setting information including the SSID detected by the access point detection portion 124 as location information, from wireless LAN interface settings stored in the communication interface setting information storage portion 115 corresponding to each of the network settings. If multiple SSIDs are set for the access point located in the vicinity of the information processing apparatus 10, or if multiple access points are positioned in the vicinity of the apparatus 10, the access point detection portion 124 detects multiple SSIDs. In that case, a plurality of wireless LAN interface settings exist including the SSIDs detected by the access point detection portion 124 among a plurality of wireless LAN interface settings stored in the communication interface setting information storage portion 115. The location information detection portion 128 will detect as location information a location that corresponds to wireless LAN interface setting information that is selected based on the priority predetermined by the user of the apparatus 10 and set in the priority field of the communication interface setting information storage portion 115.

When the information processing apparatus 10 is enabled to communicate using the communication interface 100b in accordance with setting by the wireless LAN setting information selection portion 126, the location information detection portion 128 detects as location information a location corresponding to wireless LAN interface setting information that is set for the communication interface 100b by the wireless LAN setting information selection portion 126.

In the above-mentioned process, the location information detection portion 128 may detect location information preferentially in the order of the location information input portion 122, access point detection portion 124, and wireless LAN setting information selection portion 126. The location information acquisition portion 120 obtains location information detected by the location information detection portion 128 and supplies it to the network setting portion 130.

Based on the location information obtained by the location information acquisition portion 120, the network setting portion 130 selects network setting information for the location of the information processing apparatus 10 from a plurality of network settings for each of a plurality of locations and sets it for the communication portion 140 in the information processing apparatus 10 (S920).

The communication interface setting portion 135 then selects communication interface setting for use in communication from the plurality of communication interface settings in the communication interface setting information storage portion 115 that are associated with network setting information set by the network setting portion 130, and sets it for the communication interface corresponding to the communication interface setting (S930). Here, the communication interface setting portion 135 selects communication interface setting information that has the highest communication speed stored in the communication interface setting information storage portion 115 and that is capable of effective communication, from communication interface setting information corresponding to the location specified by the location information obtained at S910. Alternatively, the communication interface setting portion 135 may select communication interface setting information that has the highest priority stored in the communication interface setting information storage portion 115 and that is capable of effective communication, from communication interface settings corresponding to the location specified by the location information obtained at S910.

The communication portion 140 then carries out communication in accordance with the network setting for the location specified by the location information obtained at S910 and the communication interface setting that has been selected at S930 from among the plurality of communication interface settings associated with network setting information.

FIG. 10 shows an example of the hardware configuration of the information processing apparatus 10 of the embodiment. The information processing apparatus 10 of the embodiment is implemented with a CPU peripheral portion having a CPU 1000, RAM 1020, graphic controller 1075, and display device 1080 that are interconnected by a host controller 1082; an I/O portion having communication interfaces 100a and 100b, hard disk drive 1040, and CD-ROM drive 1060 that are connected to the host controller 1082 by an I/O controller 1084; and a legacy I/O portion having ROM 1010, flexible disk drive 1050, and I/O chip 1070 that are connected to the I/O controller 1084.

The host controller 1082 connects the RAM 1020 with the CPU 1000 and graphic controller 1075 that access the RAM 1020 at a high transfer rate. The CPU 1000 operates in accordance with a program stored in the ROM 1010 and RAM 1020 and controls each portion. The graphic controller 1075 obtains image data generated by the CPU 1000 and the like in a frame buffer provided in the RAM 1020 and displays it on the display device 1080. Alternatively, the graphic controller 1075 may internally include a frame buffer for storing image data generated by the CPU 1000 and the like.

The I/O controller 1084 connects the host controller 1082 with the communication interfaces 100a and 100b, hard disk drive 1040, and CD-ROM drive 1060 that are relatively high-speed I/O devices. The communication interfaces 100a and 100b communicate with other devices via a network. The hard disk drive 1040 stores programs and data to be used by the information processing apparatus 10. The CD-ROM drive 1060 reads a program or data from the CD-ROM 1095 and supplies it to the RAM 1020 and/or hard disk drive 1040.

To the I/O controller 1084, the ROM 1010 and relatively low-speed I/O devices such as the flexible disk drive 1050 and I/O chip 1070 are connected. The ROM 1010 stores a boot program executed by the information processing apparatus 10 at a start-up time and programs dependent on the hardware of the information processing apparatus 10. The flexible disk drive 1050 reads programs and/or data from the flexible disk 1090 and provides it to the CPU 1000 and/or hard disk drive 1040 via the I/O controller 1084. The I/O chip 1070 connects the flexible disk 1090, or various I/O devices via a parallel port, serial port, keyboard port, and mouse port, for example.

Programs provided to the CPU 1000 via the RAM 1020 are supplied by the user as stored on a recording medium such as the flexible disk 1090, CD-ROM 1095, or IC card. The programs are read out from the recording medium to be installed in the CPU 1000 via the I/O controller 1084 and the RAM 1020 and executed by the CPU 1000.

The communication control program that is installed and executed in the information processing apparatus 10 comprises an application processing module; network setting information storage module; communication interface setting information storage module; location information acquisition module having a location information input module, access point detection module, wireless LAN setting information selection module and location information detection module; network setting module; communication interface setting module; communication module; network setting information display module; network setting information input module; communication interface setting information display module; and communication interface setting information input module. The program and modules cause the information processing apparatus 10 to function as the application processing portion 105; network setting information storage portion 110; communication interface setting information storage portion 115; location information acquisition portion 120 that comprises the location information input portion 122, access point detection portion 124, wireless LAN setting information selection portion 126 and location information detection portion 128; network setting portion 130; communication interface setting portion 135; communication portion 140; network setting information display portion 145; network setting information input portion 150; communication interface setting information display portion 155; and communication interface setting information input portion 160, respectively.

The program or the modules may be stored on an external storage medium. A storage medium being a non-transitory signal includes optical recording media such as DVD and PD, magneto-optical recording media such as MD, tape media, and semiconductor memory such as IC card, in addition to the flexible disk 1090, CD-ROM 1095. Alternatively, a storage device such as hard disk and RAM provided in a server system connected to a dedicated communication network or the Internet may be used as the recording medium, and the program may be provided to the information processing apparatus 10 over a network.

Although the invention has been described with its embodiment, the technical range of the invention is not limited to the range set forth by the above embodiment. Various modifications or improvements may be made to the embodiment. It is apparent from the claims that a form with such modifications or improvements can be also embraced within the technical range of the invention.

According to the embodiment described above, the information processing apparatus, communication control method, and communication control program are realized shown in the following items.

(Item 1)

An information processing apparatus having a plurality of communication interfaces, comprising: a network setting information storage portion for storing, for each of a plurality of locations, network setting information to be set in the information processing apparatus so as to perform communication via a network at a location; a communication interface setting information storage portion for storing, for each of plural pieces of network setting information, communication interface setting information to be set for each of the plurality of communication interfaces for performing communication using the network setting information; a location information acquisition portion for obtaining location information indicating the location of the information processing apparatus; a network setting portion for, based on the location information, selecting one piece of the network setting information that corresponds to the location of the information processing apparatus from the plural pieces of network setting information each corresponding to each of the plurality of locations, and setting the information in the information processing apparatus; a communication interface setting portion for selecting one piece of communication interface setting information from a plural pieces of communication interface setting information that are associated with the piece of network setting information, and setting the information for one of the communication interfaces that corresponds to the piece of communication interface setting information; and a communication portion for performing communication by way of the communication interface based on the setting in accordance with the piece of network setting information and the piece of communication interface setting information.

(Item 2)

The information processing apparatus according to Item 1, wherein at least one of the plurality of communication interfaces is a wireless LAN interface; the communication interface setting information storage portion stores wireless LAN interface setting information as the communication interface setting information including a SSID (Service Set ID) that is set for an access point for the location in accordance with the plurality of locations; and the location information acquisition portion comprises: an access point detection portion for detecting a SSID that is set for an access point located in the vicinity of the information processing apparatus; and a location information detection portion for detecting as the location information a location that corresponds to the wireless LAN interface setting information including the SSID detected by the access point detection portion, from among the plural pieces of wireless LAN interface setting information.

(Item 3)

The information processing apparatus according to Item 2, wherein when there exist plural pieces of the wireless LAN interface setting information including the SSID detected by the access point detection portion among the plural pieces of wireless LAN interface setting information, the location detection portion detects as the location information a location that corresponds to the wireless LAN interface setting information which is selected based on a priority preset by a user of the information processing apparatus.

(Item 4)

The information processing apparatus according to Item 1, wherein at least one of the plurality of communication interfaces is a wireless LAN interface; the communication interface setting information storage portion stores, for each of the plurality of locations, wireless LAN interface setting information that is communication interface setting information to be set for the wireless LAN interface; and the location information acquisition portion comprises a wireless LAN setting information selection portion for sequentially setting plural pieces of wireless LAN interface setting information that are stored as associated with the plural pieces of network setting information for the wireless LAN interface; and a location information detection portion for, if the information processing apparatus is enabled to communicate using the wireless LAN interface in accordance with setting by the wireless LAN setting information selection portion, detecting as the location information a location corresponding to the wireless LAN interface setting information set by the wireless LAN setting information selection portion.

(Item 5)

The information processing apparatus according to Item 1, further comprising a network setting information input portion for prompting a user of the information processing apparatus to enter network setting information for the location and storing it in the network setting information storage portion; and a communication interface setting information input portion for prompting the user of the information processing apparatus to sequentially enter plural pieces of communication interface setting information corresponding to the network setting information and storing it in the communication interface setting information storage portion.

(Item 6)

An information processing apparatus having a plurality of communication interfaces, comprising: a network setting information input portion for prompting a user of the information processing apparatus to enter, for each of a plurality of locations, network setting information that should be set in the information processing apparatus so as to perform communication via a network at a location; a communication interface setting information input portion for prompting the user of the information processing apparatus to sequentially enter, for each of plural pieces of network setting information communication, interface setting information that should be set for each of the plurality of communication interfaces; a location information acquisition portion for obtaining location information indicating the location of the information processing apparatus; and a communication portion for performing communication based on setting according to the network setting information corresponding to the location specified by the location information and the communication interface setting information selected from the plural pieces of communication interface setting information associated with the network setting information.

(Item 7)

The information processing apparatus according to Item 6, wherein if distinct communication interface setting information is specified in setting one piece of the communication interface setting information, the communication interface setting information input portion associates the piece of communication interface setting information with the network setting information corresponding to the distinct communication interface setting information.

(Item 8)

The information processing apparatus according to Item 6, wherein if the user of the information processing apparatus requests a change to the network setting information, the communication portion communicates based on setting according to the modified network setting information when it communicates using all of communication interface setting information that is selected from the plural pieces of communication interface setting information associated with the modified network setting information.

(Item 9)

A communication control method for controlling communication by an information processing apparatus having a plurality of communication interfaces, comprising: a network setting information storage step of storing, for each of a plurality of locations, network setting information to be set in the information processing apparatus so as to perform communication via a network at a location; a communication interface setting information storage step of storing, for each of plural pieces of network setting information, communication interface setting information to be set for each of the plurality of communication interfaces for performing communication using the network setting information; a location information acquisition step of obtaining location information indicating the location of the information processing apparatus; a network setting step of, based on the location information, selecting one piece of network setting information that corresponds to the location of the information processing apparatus from the plural pieces of network setting information each corresponding to each of the plurality of locations, and setting the information in the information processing apparatus; a communication interface setting step of selecting one piece of the communication interface setting information from plural pieces of the communication interface setting information that are associated with the piece of network setting information, and setting the information for one of the communication interfaces that corresponds to the piece of communication interface setting information; and a communication step of performing communication by way of the communication interface based on the setting in accordance with the piece of network setting information and the piece of communication interface setting information.

(Item 10)

A communication control method for controlling communication by an information processing apparatus having a plurality of communication interfaces, comprising: a network setting information input step of prompting a user of the information processing apparatus to enter, for each of a plurality of locations, network setting information that should be set in the information processing apparatus so as to perform communication via a network at a location; a communication interface setting information input step of prompting the user of the information processing apparatus to sequentially enter, for each of the plural pieces of network setting information, communication interface setting information that should be set for each of the plurality of communication interfaces; a location information acquisition step of obtaining location information indicating the location of the information processing apparatus; and a communication step of performing communication based on setting according to the network setting information corresponding to the location specified by the location information and the communication interface setting information selected from plural pieces of communication interface setting information associated with the network setting information.

(Item 11)

A communication control program for an information processing apparatus having a plurality of communication interfaces, for causing the information processing apparatus to function as a network setting information storage portion for storing, for each of a plurality of locations, network setting information to be set in the information processing apparatus so as to perform communication via a network at a location; a communication interface setting information storage portion for storing, in accordance with each of plural pieces of network setting information, communication interface setting information to be set for each of the plurality of communication interfaces for performing communication using the network setting information; a location information acquisition portion for obtaining location information indicating the location of the information processing apparatus; a network setting portion for, based on the location information, selecting one piece of network setting information that corresponds to the location of the information processing apparatus from a plural pieces of the network setting information each corresponding to each of the plurality of locations, and setting the information in the information processing apparatus; a communication interface setting portion for selecting one piece of communication interface setting information from plural pieces of communication interface setting information that are associated with the piece of network setting information, and setting the information for one of the communication interfaces that corresponds to the piece of communication interface setting information; the program causing the information processing apparatus to communicate using the communication interface based on setting according to the piece of network setting information and the piece of communication interface setting information.

(Item 12)

A communication control program for an information processing apparatus having a plurality of communication interfaces, for causing the information processing apparatus to function as a network setting information input portion for prompting a user of the information processing apparatus to enter, for each of a plurality of locations, network setting information that should be set in the information processing apparatus so as to perform communication via a network at a location; a communication interface setting information input portion for prompting the user of the information processing apparatus to sequentially enter, for each of plural pieces of network setting information, communication interface setting information that should be set for each of the plurality of communication interfaces; a location information acquisition portion for obtaining location information indicating the location of the information processing apparatus; the program causing the information processing apparatus to communicate based on setting according to the network setting information corresponding to the location specified by the location information and the communication interface setting information selected from plural pieces of communication interface setting information associated with the network setting information.

(Item 13)

A recording medium having the communication control program according to Item 11 or 12 stored thereon.

As is apparent from the foregoing, according to the invention, an information processing apparatus, communication control method, and communication control program can be provided that allow one to easily set a plurality of communication interfaces and selectively use them by sharing network setting among the communication interfaces for each of a plurality of locations.

What is claimed is:

1. An information processing apparatus having a plurality of communication interfaces, comprising:
    a network setting information storage portion for storing, for each of a plurality of locations, network setting information to be set in the information processing apparatus so as to perform communication via a network at a location;
    a communication interface setting information storage portion for storing, for each of plural pieces of the network setting information, communication interface setting information to be set for each of the plurality of communication interfaces for performing communication using the network setting information;
    a location information acquisition portion for obtaining location information indicating the location of the information processing apparatus;
    a network setting portion for, based on the location information, selecting one piece of the network setting information that corresponds to the location from the plural pieces of network setting information each corresponding to one of the plurality of locations, and setting the information in the information processing apparatus;
    a communication interface setting portion for selecting one piece of the communication interface setting information from plural pieces of the communication interface setting information that are associated with the one piece of network setting information, and setting the information for one of the communication interfaces that corresponds to the one piece of communication interface setting information; and
    a communication portion for performing communication by way of the one of communication interface based on the setting in accordance with the one piece of network setting information and the one piece of communication interface setting information;
    wherein the location information acquisition portion comprises a location information detection portion for detecting as the location information a piece of common network information based on processing result of a user input location information and a stored location information.

2. The information processing apparatus according to claim 1, wherein at least one of the plurality of communication interfaces is a wireless LAN interface;
    the communication interface setting information storage portion stores, for each of the plurality of locations, wireless LAN interface setting information as the communication interface setting information including a SSID Service Set ID. that is set for an access point for the location; and
    the location information acquisition portion comprises
        an access point detection portion for detecting the SSID that is set for an access point located in the vicinity of the information processing apparatus, and
        the location information detection portion detects as the location information a location that corresponds to the wireless LAN interface setting information including the SSID detected by the access point detection portion, from among the plural pieces of wireless LAN interface setting information.

3. The information processing apparatus according to claim 2, wherein when there are plural pieces of the wireless LAN interface setting information including the SSID detected by the access point detection portion among the plural pieces of wireless LAN interface setting information, the location detection portion detects as the location information a location that corresponds to the wireless LAN interface setting information which is selected based on a priority preset by a user of the information processing apparatus.

4. The information processing apparatus according to claim 1, wherein at least one of the plurality of communication interfaces is a wireless LAN interface;
    the communication interface setting information storage portion stores, for each of the plurality of locations, wireless LAN interface setting information that is the communication interface setting information to be set for the wireless LAN interface; and
    the location information acquisition portion comprising:
    a wireless LAN setting information selection portion for sequentially setting plural pieces of the wireless LAN interface setting information that are stored as associated with the plural pieces of network setting information for the wireless LAN interface; and
    a location information detection portion for, if the information processing apparatus is enabled to communicate using the wireless LAN interface in accordance with setting by the wireless LAN setting information selection portion, detecting as the location information a location corresponding to the wireless LAN interface setting information set by the wireless LAN setting information selection portion.

5. The information processing apparatus according to claim 1, further comprising
a network setting information input portion for prompting a user of the information processing apparatus to enter network setting information for the location and storing it in the network setting information storage portion; and
a communication interface setting information input portion for prompting the user of the information processing apparatus to sequentially enter plural pieces of communication interface setting information corresponding to the network setting information and storing it in the communication interface setting information storage portion.

6. An information processing apparatus having a plurality of communication interfaces, comprising:
a network setting information input portion for prompting a user of the information processing apparatus to enter, for each of a plurality of locations, network setting information that should be set in the information processing apparatus so as to perform communication via a network at a location;
a communication interface setting information input portion for prompting the user of the information processing apparatus to sequentially enter, for each of plural pieces of the network setting information, communication interface setting information that should be set for each of the plurality of communication interfaces;
a location information acquisition portion for obtaining location information indicating the location of the information processing apparatus; and
a communication portion for performing communication based on setting according to the network setting information corresponding to the location specified by the location information and the communication interface setting information selected from plural pieces of the communication interface setting information associated with the network setting information;
wherein the location information acquisition portion comprises a location information detection portion for detecting as the location information a piece of common network information based on processing result of a user input location information and a stored location information.

7. The information processing apparatus according to claim 6, wherein if distinct communication interface setting information is specified in setting one piece of the communication interface setting information, the communication interface setting information input portion associates the one piece of communication interface setting information with the network setting information corresponding to the distinct communication interface setting information.

8. The information processing apparatus according to claim 6, wherein if the user of the information processing apparatus requests a change to the network setting information, the communication portion communicates based on setting according to the modified network setting information when it communicates using all of the communication interface setting information that is selected from the plural pieces of communication interface setting information associated with the modified network setting information.

9. A communication control method for controlling communication by an information processing apparatus having a plurality of communication interfaces, comprising:
a network setting information storage step of storing, for each of a plurality of locations, network setting information to be set in the information processing apparatus so as to perform communication via a network at a location;
a communication interface setting information storage step of storing, for each of plural pieces of the network setting information, communication interface setting information to be set for each of the plurality of communication interfaces for performing communication using the network setting information;
a location information acquisition step of obtaining location information indicating the location of the information processing apparatus;
a network setting step of, based on the location information, selecting one piece of the network setting information that corresponds to the location of the information processing apparatus from the plural pieces of network setting information each corresponding to each of the plurality of locations, and setting the information in the information processing apparatus;
a communication interface setting step of selecting one piece of the communication interface setting information from plural pieces of the communication interface setting information that are associated with the one piece of network setting information, and setting the information for one of the communication interfaces that corresponds to the one piece of communication interface setting information; and
a communication step of performing communication by way of the one communication interface based on the setting in accordance with the one piece of network setting information and the one piece of communication interface setting information;
wherein the location information acquisition step comprises a step of detecting as the location information a piece of common network information based on processing result of a user input location information and a stored location information.

10. A communication control method for controlling communication by an information processing apparatus having a plurality of communication interfaces, comprising:
a network setting information input step of prompting a user of the information processing apparatus to enter, for each of a plurality of locations, network setting information that should be set in the information processing apparatus so as to perform communication via a network at a location;
a communication interface setting information input step of prompting the user of the information processing apparatus to sequentially enter, for each of the plural pieces of network setting information, communication interface setting information that should be set for each of the plurality of communication interfaces;
a location information acquisition step of obtaining location information indicating the location of the information processing apparatus; and
a communication step of performing communication based on setting according to the network setting information corresponding to the location specified by the location information and the communication interface setting information selected from plural pieces of the communication interface setting information associated with the network setting information;
wherein the location information acquisition step comprises a step of detecting as the location information a piece of common network information based on processing result of a user input location information and a stored location information.

11. A recording medium being a non-transitory signal storing a communication control program for an information processing apparatus having a plurality of communication interfaces, when executed the communication control program causes the information processing apparatus to function as

- a network setting information storage portion for storing, for each of a plurality of locations, network setting information to be set in the information processing apparatus so as to perform communication via a network at a location;
- a communication interface setting information storage portion for storing, for each of plural pieces of the network setting information, communication interface setting information to be set for each of the plurality of communication interfaces for performing communication using the network setting information;
- a location information acquisition portion for obtaining location information indicating the location of the information processing apparatus;
- a network setting portion for, based on the location information, selecting one piece of the network setting information that corresponds to the location of the information processing apparatus from a plural pieces of the network setting information each corresponding to each of the plurality of locations, and setting the information in the information processing apparatus; and
- a communication interface setting portion for selecting one piece of the communication interface setting information from plural pieces of the communication interface setting information that are associated with the one piece of network setting information, and setting the information for one of the communication interfaces that corresponds to the one piece of communication interface setting information,
- the program causing the information processing apparatus to communicate using the one communication interface based on setting according to the one piece of network setting information and the one piece of communication interface setting information;
- wherein the location information acquisition portion comprises a location information detection portion for detecting as the location information a piece of common network information based on processing result of a user input location information and a stored location information.

12. A recording medium being a non-transitory signal storing a communication control program for an information processing apparatus having a plurality of communication interfaces, when executed the communication control program causes the information processing apparatus to function as

- a network setting information input portion for prompting a user of the information processing apparatus to enter, for each of a plurality of locations, network setting information that should be set in the information processing apparatus so as to perform communication via a network at a location;
- a communication interface setting information input portion for prompting the user of the information processing apparatus to sequentially enter, for each of plural pieces of the network setting information, communication interface setting information that should be set for each of the plurality of communication interfaces; and
- a location information acquisition portion for obtaining location information indicating the location of the information processing apparatus,
- the program causing the information processing apparatus to communicate based on setting according to the network setting information corresponding to the location specified by the location information and the communication interface setting information selected from plural pieces of the communication interface setting information associated with the network setting information;
- wherein the location information acquisition portion comprises a location information detection portion for detecting as the location information a piece of common network information based on processing result of a user input location information and a stored location information.

* * * * *

UNITED STATES PATENT AND TRADEMARK OFFICE
CERTIFICATE OF CORRECTION

| | |
|---|---|
| PATENT NO. | : 7,668,154 B2 |
| APPLICATION NO. | : 11/187186 |
| DATED | : February 23, 2010 |
| INVENTOR(S) | : Aso et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1156 days.

Signed and Sealed this

Seventh Day of December, 2010

David J. Kappos
*Director of the United States Patent and Trademark Office*